April 25, 1933.  G. F. BLUME  1,906,122
BEARING STRUCTURE
Filed July 3, 1931   2 Sheets-Sheet 1

Inventor
G. F. Blume
By C. A. Snow & Co.
Attorneys.

April 25, 1933.    G. F. BLUME    1,906,122
BEARING STRUCTURE
Filed July 3, 1931    2 Sheets-Sheet 2

Inventor
G. F. Blume
By C. A. Snow & Co.
Attorneys.

Patented Apr. 25, 1933

1,906,122

UNITED STATES PATENT OFFICE

GEORGE FRED BLUME, OF PHILADELPHIA, PENNSYLVANIA

BEARING STRUCTURE

Application filed July 3, 1931. Serial No. 548,693.

This invention relates to bearings designed primarily for use in connection with railway rolling stock.

One of the objects of the invention is the provision of a bearing means to permit the outer races thereof to be properly aligned or adjusted with respect to the inner races, thereby insuring a true fit between the races of the bearing, to reduce wear to the minimum.

An important object of the invention is to provide a bearing of this character which may be readily adjusted without the necessity of disassembling the bearings or races thereof.

A still further object of the invention is the provision of means to permit of adjustment of the races, to compensate for wear between the races and roller bearings.

With the foregoing and other objects in view, which will appear as the description proceeds, the invention resides in the combination and arrangement of parts, and in the details of construction hereinafter described and claimed, it being understood that changes in the precise embodiment of the invention herein disclosed, may be made within the scope of what is claimed, without departing from the spirit of the invention.

Referring to the drawings.

Figure 1:
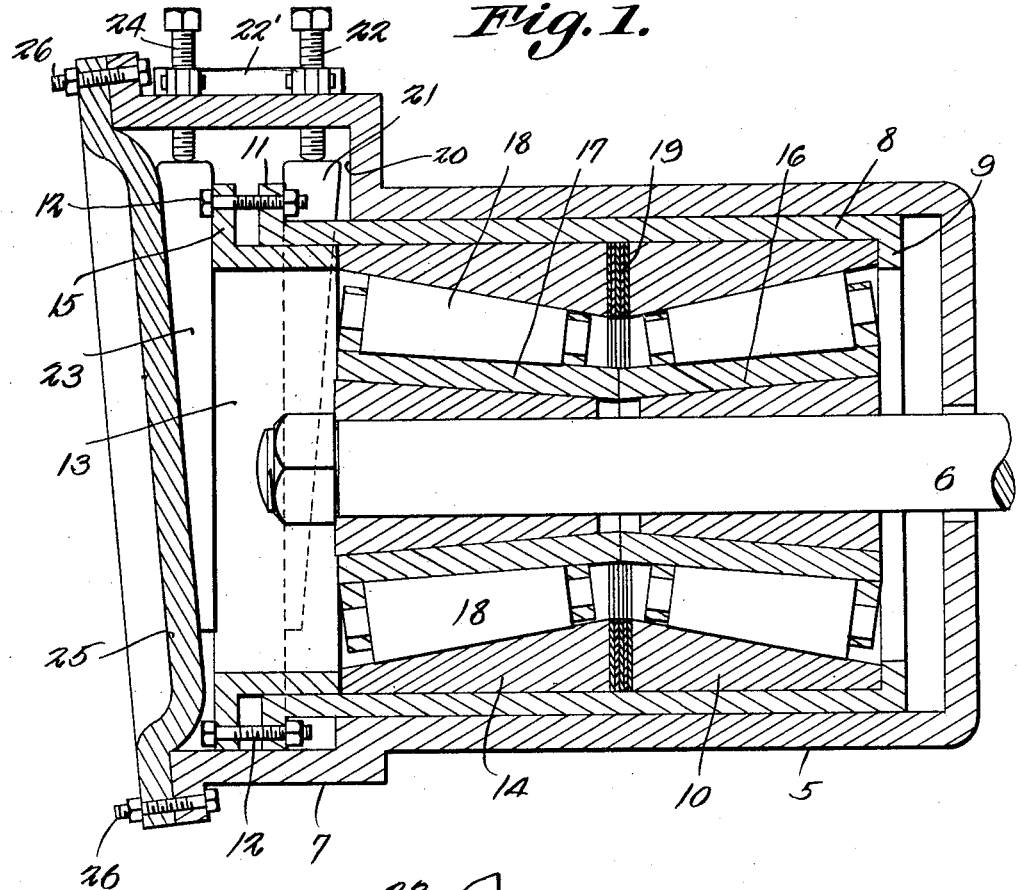
Figure 1 is a vertical sectional view through a bearing and housing constructed in accordance with the invention.
Figure 4:
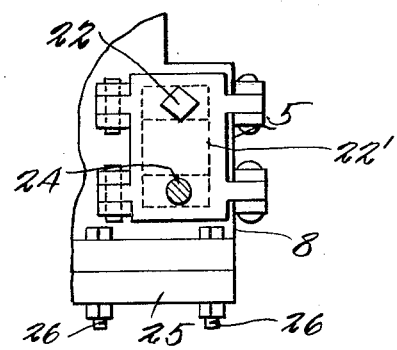
Figure 4 is a fragmental detail view of one end of the housing, illustrating the manner of mounting the adjusting screws.
Figure 2:
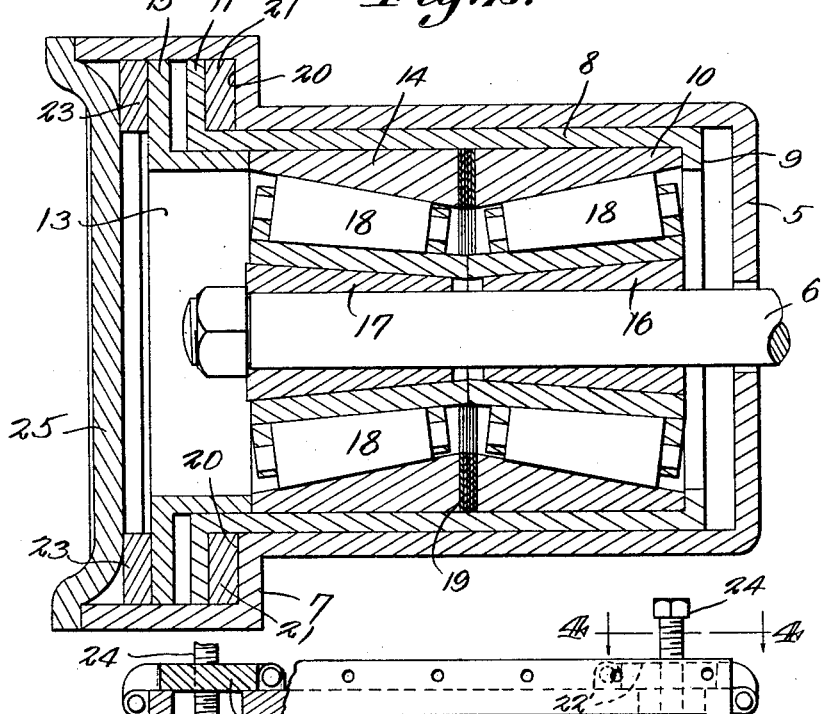
Figure 2 is a longitudinal sectional view through the bearing and housing taken at right angles to Figure 1.
Figure 3:
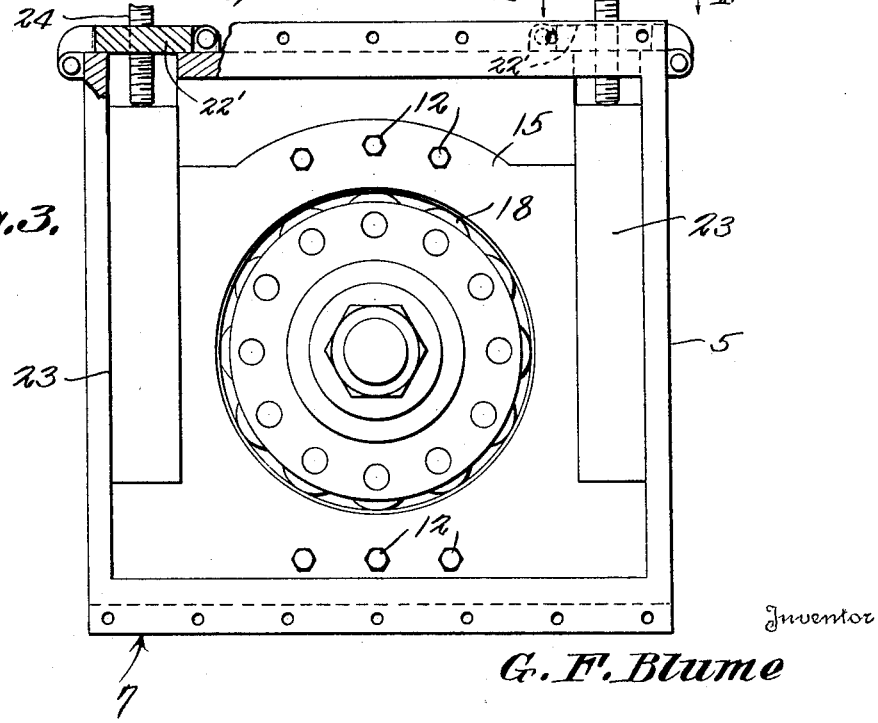
Figure 3 is an end elevational view of the bearing, the cover or closure for the bearing housing, having been removed.

Referring to the drawings in detail, the reference character 5 designates the bearing housing, into which one end of the axle 6, extends.

The housing 5 is formed with an enlarged offset end portion 7, which provides a housing for the adjusting wedges, and flanges of the sleeves, within which the bearing races are mounted.

Extending into the housing 5, is a sleeve 8, which is formed with an inwardly disposed annular flange 9, against which the inner sections 10 of the outer race abut, to hold the outer race in its positions of adjustment.

Formed at the opposite end of the sleeve 8, is an outwardly extended annular flange 11, which is formed with openings to receive the bolts 12 that pass through openings formed in the flange 11. Extended within the outer end of the sleeve 8, is a substantially short sleeve 13, that contacts with the outer sections 14 of the outer race, the sleeve being designed to closely engage the outer section of the outer race to hold the same against movement.

The enlarged offset end portion 7 of the housing, defines an annular shoulder 20 against which the tapered keys 21 engage, the tapered keys being positioned between the shoulder 20 and the flange 11 of the sleeve 8, so that when the keys 21 are forced inwardly, the sleeve 8 will be moved to the left, as shown by Figure 1 of the drawings.

It will be obvious that as the sleeve 8 is moved by the action of the keys 21, the roller races will be moved towards the outer end of the axle, on which the bearing is mounted.

The offset end portion of the housing has openings that are closed by the hinged covers 22' formed with threaded openings to receive the adjusting screws 22 which engage the keys 21 to move the keys in a manner as described.

Tapered keys 23 are also mounted within the enlarged portion of the housing, and engage the flange of the sleeve 13, to the end that as the keys 23 are moved inwardly, the sleeve 13 will be forced inwardly to move the roller races and rollers, to accomplish the adjustment thereof.

Bolts 12 extend through aligning openings in the flange 15, short sleeve 13, and openings formed in the annular flange 11.

Nuts are provided on the bolts 12, and act to hold the sleeves 8 and 13, in their positions of adjustment.

The inner bearing race comprises sections 16 and 17 respectively, the bearing races being tapered to accommodate the tapered rollers 18, forming a part of the bearing.

The rollers 18 are mounted in their cages in the usual and well known manner.

Disposed between the inner ends of the sections of the outer race, are a plurality of washers or shims 19, which are adapted to hold the outer race sections spaced apart at all times.

Should it be necessary to adjust the bearings for wear, certain of these washers may be removed, allowing the bearing races and bearings to move towards each other.

Adjusting screws 24 pass through the covers 22' and engage the keys 23, as clearly shown by Figure 1.

The outer end of the housing, is closed by means of the cover plate 25, which is bolted to the housing, by means of the bolts 26.

It will of course be understood that the keys 23, are wedged between the cover plate 25 and the flange of the sleeve 13.

From the foregoing it will be obvious that due to the construction shown and described, the roller races and rollers may be adjusted longitudinally of the axle 6, to properly align the bearings and races, to insure against undue wear caused by the non-alignment of the bearings and races.

Having thus described the invention, what is claimed is:

1. In a bearing, the combination of a housing adapted to receive a shaft, roller bearings and roller races interposed between the shaft and housing, a sleeve between the roller races and housing, a flange on one end of the sleeve, a sleeve fitted in one end of the first mentioned sleeve and engaging the opposite ends of the races, and keys cooperating with the sleeves for moving the sleeves to adjust the rollers and races longitudinally of the shaft.

2. In a bearing, the combination of a housing adapted to receive a shaft, roller bearings and roller races interposed between the shaft and housing, a sleeve in which the roller races and bearings are supported, a sleeve extending into the first mentioned sleeve and engaging the roller races, keys engaging the second sleeve, and adjusting screws operating through the housing and engaging the keys for moving the keys to adjust the sleeves and bearings.

3. In a bearing housing, sleeves mounted within the housing, said housing having openings formed therein, hinged covers for closing the openings, adjustable sleeves within the housing, roller races mounted within one of the sleeves, wedge shaped keys for adjusting the sleeves with respect to each other to align the roller races with the axle on which the bearing is mounted, said covers having openings, and bolts extended through the openings and engaging the keys for moving the keys to adjust the sleeves.

4. In a bearing, the combination of a housing adapted to receive a shaft, outer roller bearing races and inner roller bearing races interposed between the shaft and housing, an outer sleeve having an inwardly extended annular flange engaging the inner ends of the outer bearing races, an outwardly extended flange on the outer end of the outer sleeve, an inner sleeve fitted in the outer sleeve and engaging the outer end of the outer roller bearing races, a flange on the last mentioned sleeve, and tapered keys operating within the housing and engaging the outwardly extended flanges of the sleeves, and means for moving the keys to adjust the sleeves towards and away from each other to adjust the bearing races.

5. In a bearing, the combination of a housing adapted to receive a shaft, outer roller bearing races and inner roller bearing races interposed between the shaft and housing, an outer sleeve within the housing and disposed between the bearing races and housing, a flange on the inner end of the sleeve and engaging the inner end of one of the outer bearing races, a sleeve fitted within the outer end of the first mentioned sleeve and contacting with the outer ends of one of the outer bearing races, and means for moving the sleeves with respect to each other to adjust the outer bearing races towards and away from each other.

6. In a bearing, the combination of a housing adapted to receive a shaft, outer roller bearing races and inner roller bearing races, said roller bearing races being interposed between the shaft and housing, an outer sleeve within the housing and disposed between the bearing races and housing, means on the inner ends of the outer roller bearing races for adjusting the outer roller bearing races towards and away from each other, a sleeve fitted in the outer end of the first mentioned sleeve, and engaging the outer ends of the outer bearing races, outwardly extended flanges on the sleeves, and tapered keys within the housing and engaging the last mentioned flanges for adjusting the bearing races towards and away from each other.

In testimony that I claim the foregoing as my own, I have hereto affixed my signature.

GEORGE FRED BLUME.